United States Patent
Zangi et al.

(10) Patent No.: US 6,707,849 B1
(45) Date of Patent: Mar. 16, 2004

(54) METHODS, RECEIVERS AND EQUALIZERS HAVING INCREASED COMPUTATIONAL EFFICIENCY

(75) Inventors: Kambiz C. Zangi, Durham, NC (US); Rajaram Ramesh, Cary, NC (US); Dennis Hui, Cary, NC (US); Jung-Fu Cheng, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/499,977

(22) Filed: Feb. 8, 2000

(51) Int. Cl.⁷ .............................. H04L 25/03; H03D 1/04
(52) U.S. Cl. ..................... 375/233; 375/262; 375/341; 375/346; 714/792; 714/794; 714/795; 714/796
(58) Field of Search ............................. 375/229, 232, 375/233, 262, 265, 340, 341, 346, 348; 714/792, 794, 795, 796

(56) References Cited

U.S. PATENT DOCUMENTS

| | | | |
|---|---|---|---|
| 5,774,504 A | | 6/1998 | Huszar et al. |
| 6,154,507 A | * | 11/2000 | Bottomley ................... 375/340 |
| 6,252,904 B1 | * | 6/2001 | Agazzi et al. ............... 375/233 |
| 6,442,212 B1 | * | 8/2002 | Kratochwil ................. 375/265 |
| 6,608,862 B1 | * | 8/2003 | Zangi et al. ................. 375/232 |
| 6,658,071 B1 | * | 12/2003 | Cheng ......................... 375/348 |

FOREIGN PATENT DOCUMENTS

EP      0 902 545 A1    3/1999
WO      WO 01/60002 A1 *  8/2001

OTHER PUBLICATIONS

S. Ariyavisitakul et al; *Joint Equalization and Interference Suppression for High Data Rate Wireless Systems*; 1999 IEEE vol. Conf. 49; pp 700–706 (XP 000937866).

PCT International Search Report PCT/US01/01503.

Proakis, *Digital Communications*, McGraw–Hill, 1995, pp. 589–593.

Duel–Hallen et al., *Delayed Decision–Feedback Sequence Estimation*, IEEE Transactions on Communications, vol. 37, No. 5, May, 1989, pp. 428–436.

* cited by examiner

*Primary Examiner*—Young T. Tse
(74) *Attorney, Agent, or Firm*—Myers Bigel Sibley & Sajovec

(57) ABSTRACT

Metrics associated with each branch from a previous hypothesized trellis state to each respective possible current trellis state in a DFSE equalizer can be calculated. In particular, a common portion of branch metrics can be calculated that is common to each of the branch metrics from the previous hypothesized state to each of the current possible states, and difference variables representing a difference between the common portion of the branch metrics and each of the branch metrics from the previous hypothesized state to each of the current possible states can also be calculated. The common portion of the branch metrics and each of the difference variables can then be combined to provide a respective metric for each of the possible current states.

32 Claims, 3 Drawing Sheets

METHODS, RECEIVERS AND EQUALIZERS HAVING INCREASED COMPUTATIONAL EFFICIENCY

BACKGROUND OF THE INVENTION

The present invention relates to the field of communications and more particularly, to receiving methods and systems.

Digital wireless communications systems use equalization to compensate for intersymbol interference (ISI) resulting from time dispersion and/or delay spread in a radio channel. Typically, a non-linear equalizer, such as a Maximum Likelihood Sequence Estimation (MLSE) equalizer (also known as a Viterbi equalizer), can be used to provide coherent demodulation, and thus compensate for intersymbol interference (ISI), in such digital wireless communications systems. An MLSE equalizer considers various hypothesis for a transmitted symbol sequence, and with a model of the dispersive radio channel, determines which hypothesis best fits the received samples. This determination can be realized using the Viterbi algorithm. The MLSE equalization technique is discussed, for example by J. C. Proakis in Digital Communications, McGraw-Hill (1995) pages 589–593. An MLSE equalizer, however, may be difficult to implement.

With an MLSE equalizer, transmitted symbols s(n) can take values from an 8PSK constellation:

$$\{e^{j2\pi k/8}\}_{k=0}^{k=7},$$

and can be transmitted over a radio channel to a radio receiver. At the receiver, the received signal can be filtered, amplified, and mixed down using I and Q carriers, then sampled once every symbol period T, providing a received signal stream r(n). In this example, the channel can include L rays such that:

$$r(n) = \sum_{i=0}^{L-1} h(i)s(n-i) + w(n). \quad (1)$$

In this equation, h(i) denotes a complex-valued channel tap and w(n) is additive noise or interference.

Using N to denote the number of transmitted 8PSK symbols, there will be $8^N$ possible transmitted sequences of length N. The Viterbi algorithm/equalizer provides a way to determine a best sequence by traveling on a trellis. The trellis has N stages, denoted by n=0, n=1, n=2, ..., n=N−1. The states in the trellis of the Viterbi algorithm at stage n−1 are vectors of the form X(n−1)=[s(n−1), ..., s(n−L+1)], i.e. the last (L−1) most recently received symbols at time n−1. Since each element in the state vector has 8 possible values, the Viterbi trellis has $8^{L-1}$ different possible (hypothetical) values, and the Viterbi trellis has $8^{L-1}$ different possible states at each stage. Associated with each state at time n−1, there will be a stored path history including an n-tuple of 8PSK symbols from time "0" to time "n−1", and an accumulated (total) path metric M(X(n−1)). At the n-th stage of the trellis, the branch metric corresponding to the state transition from the previous state, X(n−1), to the current state, X(n), is computed using:

$$dM(X(n-1), X(n)) = \left| r(n) - \sum_{i=0}^{L-1} h(i)s(n-i) \right|^2. \quad (2)$$

This branch metric is then added to the accumulated path metric M(X(n−1)). The accumulated path metric of the state X(n) is obtained according to:

$$M(X(n)) = \text{aug min}_{X(n)} \{M(X(n-1)) + dM(X(n-1), X(n))\}. \quad (3)$$

In the accumulated path metric, the minimization is over those X(n−1)'s that have a valid state transition to X(n). Since there are 8 valid transitions to each next state X(n), $8^L$ different branch metrics need to be computed at each stage of the Viterbi trellis. The complexity of the Viterbi algorithm, which is dominated by branch metric computations, may thus be formidable when the number of channel taps L is large. For a 5-tap channel (i.e. L=5), 32,768 branch metrics may need to be computed at each stage of the Viterbi trellis.

Decision Feedback Sequence Estimation (DFSE) equalizers have thus been proposed to reduce computational complexity by reducing the number of branch metric computations at each stage of the trellis, and more particularly, by reducing the number of states in the trellis. DFSE equalizers are discussed, for example, by A. Duel-Hallen et al. in *Delayed Decision-Feedback Sequence Estimation*, IEEE Transactions on Communications, Vol. 37, No. 5, May, 1989, the disclosure of which is incorporated herein in its entirety by reference. In a DFSE equalizer L channel taps can be divided into LMLSE taps and LDFSE taps so that L=LMLSE+LDFSE. In other words, channel taps h(0) ... h(LMLSE−1) are defined as LMLSE taps, and channel taps h(LMLSE) ... h(L−1) are defined as LDFSE channel taps. The n-th stage of the trellis used for the DFSE algorithm has $8_{LMLSE-1}$ states, corresponding to vectors of the most recent LMLSE−1 symbols: XDFSE(n)=[s(n−1), ..., s(n−LMLSE+1)]. Furthermore, at time n−1 there is a stored path history including an n-tuple of 8PSK symbols from time "0" to time "n−1" associated with each DFSE state. The DFSE algorithm operates similarly to the Viterbi algorithm. The DFSE algorithm operates on the DFSE trellis, and each branch metric is computed as follows:

$$dM(X(n-1), X(n)) = \quad (4)$$
$$\left| r(n) - \sum_{i=0}^{LMLSE-1} h(i)s(n-i) - \sum_{i=LMLSE}^{L-1} h(i)\bar{s}(n-i) \right|^2.$$

In equation 4, the symbols (s(n−1), ..., s(n−LMLSE+1)) are obtained from the hypothesized state at time n−1 and the current state at time n, i.e. from (X(n−1), X(n)). The symbols ($\bar{s}$(n−LMLSE), ..., $\bar{s}$(n−L+1)) are obtained from the path history associated with the previous state X(n−1).

The number of states at each stage of the DFSE trellis is $8^{LMLSE-1}$, and 8 branches fan out from each state, so that $8^{LMLSE}$ branch metrics may need to be computed at each stage of the DFSE trellis. With a 5-tap channel and with 2 MLSE taps (LMLSE=2), 64 branch metrics need to be computed at each stage of the DFSE trellis (compared with 32,768 branch metrics in the Viterbi trellis).

Notwithstanding the DFSE algorithm discussed above, there continues to exist a need in the art for further improved DFSE equalizers having reduced computational complexity.

SUMMARY OF THE INVENTION

According to the present invention, methods, receivers, and equalizers can calculate a common portion of branch metrics that is common to each of the branch metrics from the previous hypothesized state to each of the current possible states, and difference variables can be calculated representing a difference between the common portion of the branch metrics and each of the branch metrics from the previous hypothesized trellis state to each of the current possible states. The common portion of the branch metrics and each of the difference variables can then be combined to provide a respective metric for each of the possible current states. A total number of operations used to calculate metrics in a DFSE equalizer can thus be reduced thereby reducing complexity and/or increasing performance of methods, receivers, and equalizers according to the present invention. A digital signal processor used to implement an equalizer according to the present invention, for example, can compute the metrics more efficiently, and the increased efficiency can allow use of a less complex digital signal processor, and/or an increase in the speed at which the metrics are calculated.

Operations of the present invention can be implemented, for example, using a DFSE equalizer having two MLSE taps and providing 8-PSK modulation so that there are 8 possible states at each stage of the trellis. While two MLSE taps are discussed for the purposes of illustration, any number of MLSE taps can be used according to the present invention. Moreover, the combining of the common portion of the branch metrics and each of the difference variables can include providing eight respective metrics each of which is associated with a respective one of the eight possible current states. In addition, calculating the difference variables can include calculating four difference variables. Combining the common portion of the branch metrics and each of the difference variables can thus include adding each of the four difference variables to the common portion of the branch metrics to provide four of the metrics, and subtracting each of the four difference variables from the common portion of the branch metrics to provide another four of the metrics. In other words, four difference variables can each be added to and subtracted from the common portion of the branch metrics to provide eight respective metrics.

More particularly, calculating the difference variables can include calculating a first intermediate variable as twice a product of a conjugate of a primary channel tap and a difference between a sampled signal and a summation of non-primary channel taps and hypothesized symbols corresponding to the non-primary channel taps. A second intermediate variable can be calculated as a product of the first intermediate variable and $e^{-j\pi/4}$. A first one of the difference variables can be calculated as a real portion of the first intermediate variable, a second one of the difference variables can be calculated as an imaginary portion of the first intermediate variable, a third one of the difference variables can be calculated as a real portion of the second intermediate variable, and a fourth one of the difference variables can be calculated as an imaginary portion of the second intermediate variable.

Methods, receivers, and equalizers according to the present invention can thus reduce computational complexity associated with calculating metrics at each stage of a DFSE trellis thereby increasing efficiency.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by those of skill in the art, the present invention may be embodied as methods or devices. Accordingly, the present invention may take the form of a hardware embodiment, a software embodiment or an embodiment combining software and hardware aspects.

Figure 1:
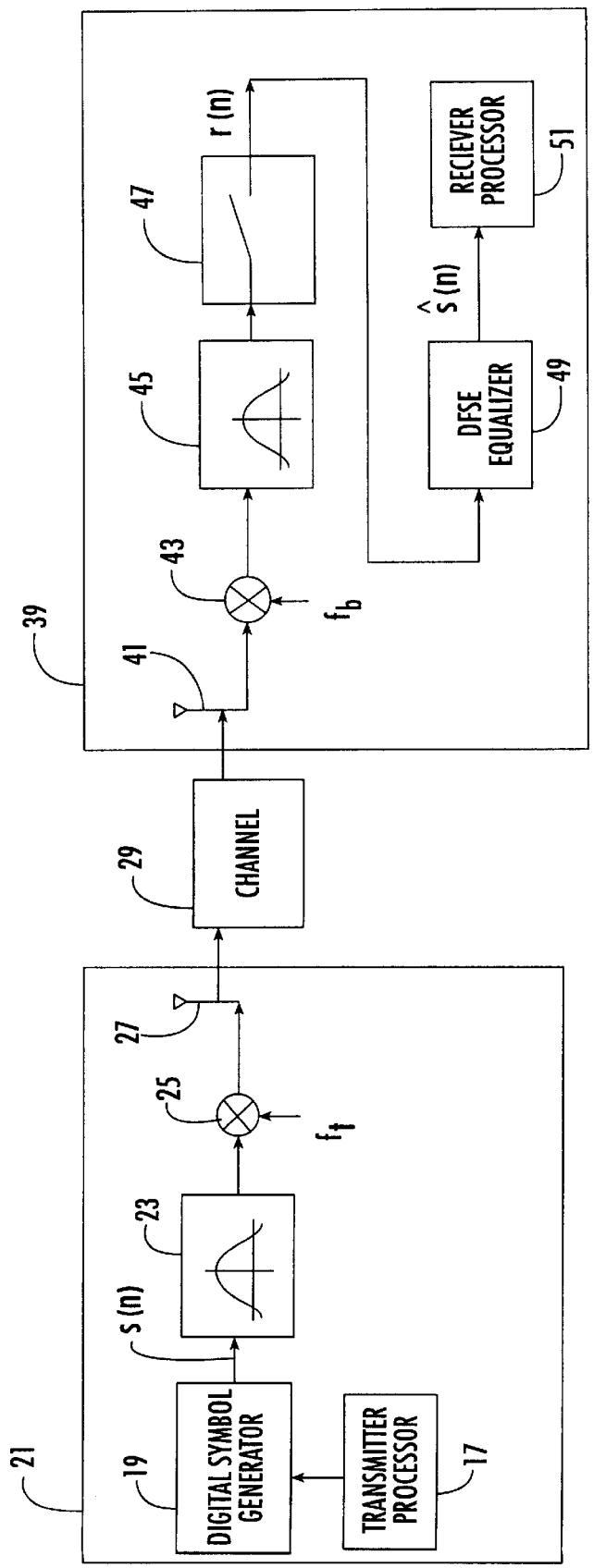
FIG. 1 is a block diagram of a communications system including a DFSE equalizer according to the present invention.

A communications system including a receiver 39 with a DFSE equalizer 49 according to the present invention is illustrated in FIG. 1. As shown, a radio transmitter 21 can include a digital symbol generator 19 that generates a sequence of symbols s(n) based on communications data generated by transmitter processor 17. The sequence of symbols s(n) can be filtered using filter 23 and mixed up to a transmitting frequency $f_t$ using mixer 25 before being transmitted as a radio signal from antenna 27 over the radio channel 29. The radio signal can be received at a receiver 39 including antenna 41, mixed down to a baseband frequency $f_b$ at the mixer 43, filtered at filter 45, and sampled at A-to-D converter 47 to provide a received signal stream r(n). The received signal stream r(n) can then be processed using DFSE equalizer 49 to produce an estimate ŝ(n) of the sequence of symbols s(n). The estimate of the sequence of symbols can then be processed by the receiver processor 51 to reproduce the communications data at the receiver 39.

The receiver 39 can also include a prefilter as discussed for example in co-pending application Ser. No. 09/378,314, entitled "Method And Apparatus For Computing Prefilter Coefficients" to Kambiz C. Zangi et al. and filed Aug. 20, 1999, (Attorney Docket No. P10412-US1-RCUR) the disclosure of which is hereby incorporated herein in its entirety by reference. Such a prefilter can be defined, for example, as a portion of the DFSE equalizer 49, as a portion of the A-to-D converter 47, or as a separate block between the A-to-D converter and the DFSE equalizer. Moreover, a baseband processor in the receiver can be defined to include the DFSE equalizer 49 as well as a synchronizer, a channel estimator, a prefilter coefficient generator, and/or a prefilter as also discussed in the co-pending Zangi et al. application. Alternately, a synchronizer, a channel estimator, a prefilter coefficient generator, and/or a prefilter can be defined as portions of the illustrated A-to-D converter, the DFSE equalizer, and/or a separate block. FIG. 1 illustrates the A-to-D converter 47 as coupled with the DFSE equalizer 49 for ease of illustration and ease of discussion herein without limiting the scope of the invention thereto.

In a DFSE equalizer with 2 MLSE channel taps, 64 branch metrics are computed at each trellis stage wherein each branch connects one possible previous state to one possible current state. These 64 branch metrics can be grouped into 8 groups such that each group includes 8 branches that fan out from a particular possible previous state $s_l(n-1)=e^{j\pi l/4}$ to each possible current state $s_l(n)=e^{j\pi k/4}$. The l-th such group will include all 8 branches that fan out of the previous state $e^{j\pi l/4}$. As there are eight previous states, $l=0, 1, \ldots, 7$, and eight possible current states, $k=0, 1, \ldots, 7$, sixty four branch metrics and total metrics are calculated at each DFSE trellis stage. While two MLSE taps are discussed for the purposes of illustration, any number of MLSE taps can be used according to the present invention.

Figure 2:
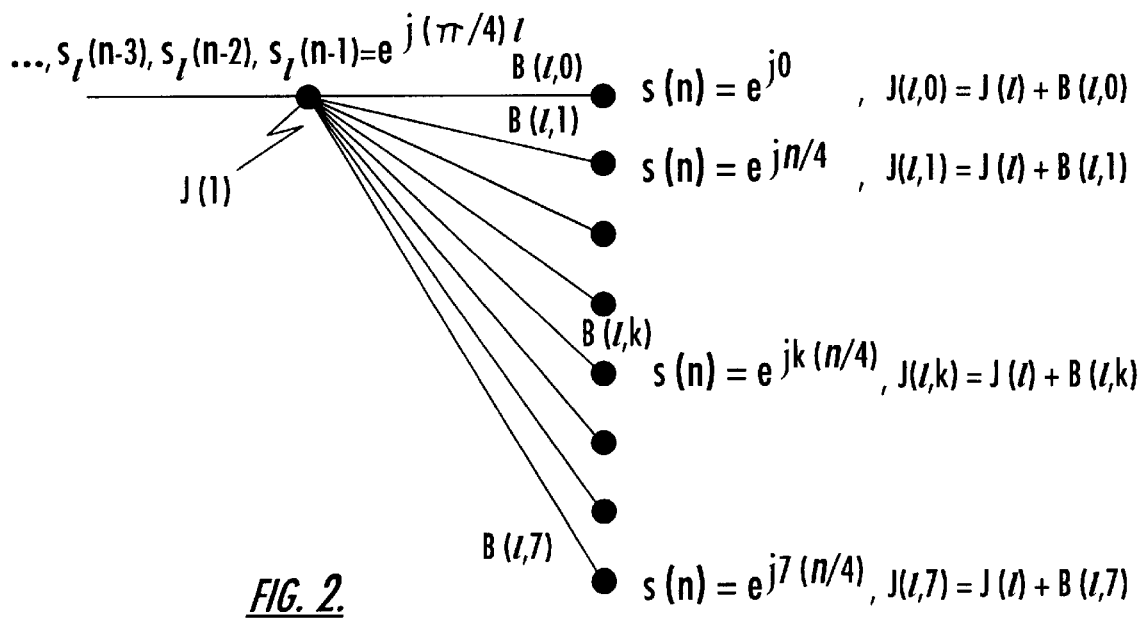
FIG. 2 is illustrates a fan-out of branch metrics from a previous state to each possible current state in a DFSE equalizer according to the present invention.

The branch metric associated with branches in the l-th group can be denoted by $\{B(l,k)\}^7_{k=0}$, such that $B(l,k)$ is the branch metric for the branch connecting the l-th previous state to the k-th current state as shown in FIG. 2. A total metric $J(l)$ for a previous hypothesized trellis state represents an error associated with a hypothesized sequence of symbols $(s_l(n-1), s_l(n-2), s_l(n-3), \ldots)$ for the previous state and preceeding states. Using this notation, the branch metrics can be calculated using:

$$B(l, k) = \left| r(n) - \sum_{i=1}^{L-1} h(i)s_l(n-i) - h(0)e^{j\pi k/4} \right|^2 \quad (5)$$

$$= |\hat{r}_l(n) - h(0)e^{j\pi k/4}|^2. \quad (6)$$

In equation 6, $\hat{r}_l(n)$ is defined as:

$$\hat{r}_l(n) = r(n) - \sum_{i=1}^{L-1} h(i)s_l(n-i) \quad (7)$$

To efficiently compute $\{B(l,k)\}^7_{k=0}$, it is noted that the summation of equation (7) can be evaluated with the help of a precomputed table assuming that the channel coefficients do not vary over the slot. Using these tables, each $\hat{r}_l(n)$ can be computed with as few as two complex additions (4 real additions).

All 8 branch metrics $\{B(l,k)\}^7_{k=0}$ from a single previous state can then be computed using intermediate variables. Equation 6 can thus be expressed as:

$$B(l, k) = |\hat{r}_l(n) - h(0)e^{j\pi k/4}|^2 \quad (8)$$

$$= |\hat{r}_l(n)|^2 + |h(0)|^2 - 2Re\{\hat{r}_l(n)h*(0)e^{-j\pi k/4}\}. \quad (9)$$

Three intermediate variables can then be defined as:

$$E_l(0) = 2\hat{r}_l(n)h*(0) \quad (10)$$

$$E_l(1) = E_l(0)e^{-j\pi/4} \quad (11)$$

$$D_l(0) = |h(0)|^2 + |\hat{r}_l(n)|^2 + J(l), \quad (12)$$

In equation (12), $J(l)$ denotes the total metric associated with the previous l-th state. The above three intermediate variables depend on the previous state (i.e. they depend on l). Furthermore, each previous state has a unique path history in a DFSE Equalizer so that $Dl(0)$ depends on the previous state and should not be ignored.

The 8 branch metrics $\{B(l,k)\}^7_{k=0}$ can thus be computed using the real/imaginary parts of the three intermediate variables defined above. If $J(l,k)$ denotes the total metric associated with branch metric $B(l,k)$ then:

$$J(l,0) = D_l(0) - E_l^R(0) \quad (13)$$

$$J(l,1) = D_l(0) - E_l^R(1) \quad (14)$$

$$J(l,2) = D_l(0) - E_l^I(0) \quad (15)$$

$$J(l,3) = D_l(0) - E_l^I(1) \quad (16)$$

$$J(l,4) = D_l(0) + E_l^R(0) \quad (17)$$

$$J(l,5) = D_l(0) + E_{lR}(1) \quad (18)$$

$$J(l,6) = D_l(0) + E_l^I(0) \quad (19)$$

$$J(l,7) = D_l(0) + E_l^I(1) \quad (20)$$

where $E_l^R(i) = \text{Real}\{E_l(i)\}$ and $E_l^I(i) = \text{Imaginary}\{E_l(i)\}$.

In addition, $(J(l,k), J(l,k+4))$ can be computed using a butterfly-type operation as shown:

$$J(l,k) = D_l(0) - E_l^R(k) \; k=0, \ldots, 3 \quad (21)$$

$$J(l,k+4) = D_l(0) + E_l^R(k). k=0, \ldots, 3 \quad (22)$$

The 8 total metrics fanning out from the l-th previous state can thus be computed as indicated below:

(1) Compute $E_l(0)$, $E_l(1)$, and $D_l(0)$[12 real operations];
(2) Compute $\{B(l,k)\}^7_{k=0}$[8 real adds]; and
(3) Compute $\{J(l,k)\}^7_{k=0}$[8 real adds].

Methods of the present invention can thus be used to reduce the number of calculations needed to perform DFSE equalization. The speed of DFSE equalization can thus be increased, and/or the complexity of hardware used to perform DFSE equalization can be reduced.

Figure 3:
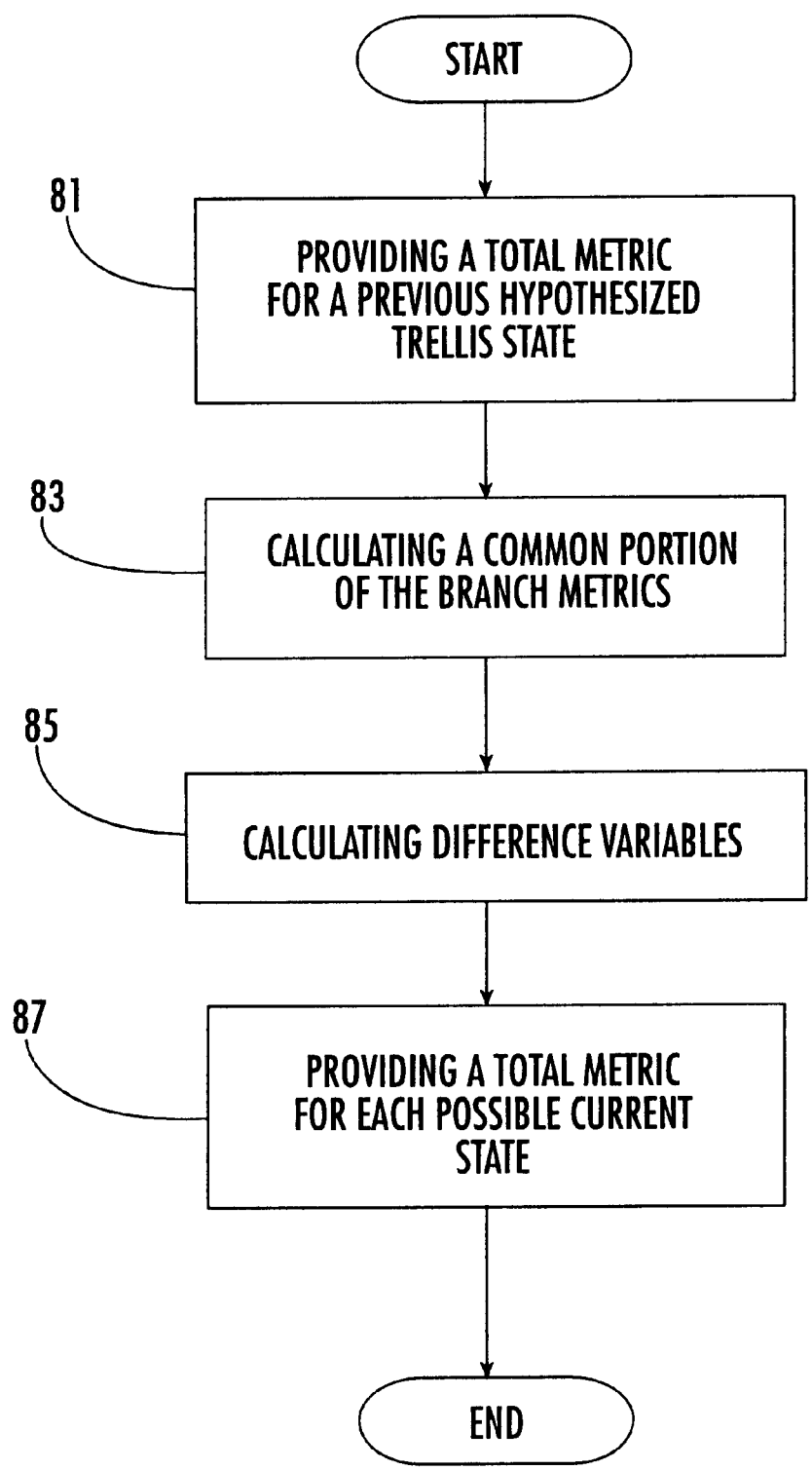
FIG. 3 is a flow chart illustrating operations of a DFSE equalizer according to the present invention.

Operations for calculating a total metric according to the present invention are illustrated in the flow chart of FIG. 3. In particular, a total metric $J(l)$ for a previous hypothesized trellis state can be provided at block 81. As discussed above, the total metric for the previous hypothesized trellis state represents an error associated with a sequence of symbols $(s_l(n-1), s_l(n-2), s_l(n-3), \ldots)$ hypothesized for the previous trellis stage and trellis stages preceding the previous trellis stage as shown in FIG. 2. A common portion of the branch metrics $|h(0)|^2 + |\hat{r}_l(n)|^2$ that is common to each of the branch metrics $B(l,k)$ can be calculated at block 83 and then combined with the total metric $J(l)$ for the previous hypothesized trellis state using equation (12) to provide $D_l(0)$. The intermediate variables $E_l(0)$ and $E_l(1)$ can be calculated using equations (10) and (11), and these intermediate variables can be used to calculated the four difference variables $E_l^R(0)$, $E_l^R(1)$, $E_l^I(0)$, and $E_l^I(1)$ at block 85. The four difference variables can then each be added to and subtracted from $D_l(0)$ using equations (13–20) to provide a total metric $J(l,k)$ for each of the current states $s(n) = e^{jk\pi/4}$ at block 87.

Operations according to the present invention can thus be used to provide a total metric for each possible current state fanning out from a previous hypothesized state at a trellis stage during equalization. The operations can also be used to provide total metrics for each possible current state fanning out from each of the previous possible states at the trellis stage. In a DFSE equalizer providing 8PSK demodulation, operations of the present invention can be used to calculate all 64 total metrics $J(l,k)$ (where $l=0, 1, \ldots, 7$ and $k=0, 1, \ldots, 7$) of a trellis stage. Moreover, operations according to the present invention can be used to calculate total metrics for preceding and subsequent trellis stages. The operations of FIG. 3 can thus be repeated within the equalizer 49 to provide total metrics for each branch at each trellis stage.

Operations of the present invention have thus been described above with respect to the flowchart illustrations of FIG. 3 and the block diagram of FIG. 1. It will be understood that each block of the flowchart illustrations and the block diagram illustrations, and combinations of blocks in the flowchart and block diagram illustrations can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims. For example, methods, receivers, and systems according to the present invention can be used in radio communications systems such as the Enhanced Data Rates for Global Evolution (EDGE), or other systems such as IS-136+to improve performance of equalization at baseband.

What is claimed is:

1. A method for calculating metrics associated with each branch from a previous hypothesized state to each respective possible current state in a DFSE equalizer, the method comprising:

calculating a common portion of branch metrics that is common to each of the branch metrics from the previous hypothesized state to each of the possible current states;

calculating difference variables representing a difference between the common portion of the branch metrics and each of the branch metrics from the previous hypothesized state to each of the possible current states; and combining the common portion of the branch metrics and each of the difference variables to provide a respective metric for each of the possible current states.

2. A method according to claim 1 wherein the DFSE equalizer is in a system providing 8-PSK modulation so that there are 8 possible current states fanning out from the previous hypothesized state:

wherein combining the common portion of the branch metrics and each of the difference variables to provide a respective metric for each of the possible current states comprises providing eight respective metrics each of which is associated with a respective one of the eight possible current states fanning out from the previous hypothesized state.

3. A method according to claim 2:

wherein calculating difference variables representing a difference between the common portion of the branch metrics and each of the branch metrics from the previous hypothesized state to each of the possible current states comprises calculating four difference variables; and wherein combining the common portion of the branch metrics and, each of the difference variables to provide a respective metric for each of the possible current states comprises adding each of the four difference variables to the common portion of the branch metrics to provide four of the metrics, and subtracting each of the four difference variables from the common portion of the branch metrics to provide another four of the metrics.

4. A method according to claim 3 wherein calculating the difference variables representing a difference between the common portion of the branch metrics and each of the branch metrics from the previous hypothesized state to each of the possible current states comprises:

calculating a first intermediate variable as twice a product of a conjugate of a primary channel tap and a difference between a sampled signal and a summation of non-primary channel taps and hypothesized symbols corresponding to the non-primary channel taps;

calculating a second intermediate variable as a product of the first intermediate variable and $e^{-j\pi/4}$;

calculating a first one of the difference variables as a real portion of the first intermediate variable;

calculating a second one of the difference variables as an imaginary portion of the first intermediate variable;

calculating a third one of the difference variables as a real portion of the second intermediate variable; and calculating a fourth one of the difference variables as an imaginary portion of the second intermediate variable.

5. A method according to claim 1 further comprising:

providing a total metric for the previous hypothesized state wherein the total metric for the previous hypothesized state represents an error associated with a hypothesized sequence of symbols hypothesized for the previous hypothesized state and hypothesized states preceding the previous hypothesized state;

wherein combining the common portion of the branch metrics and each of the difference variables to provide a respective metric for each of the possible current states further comprises combining the total metric for the previous hypothesized state so that the metric for each of the possible current states comprises a total metric for each of the possible current states being a sum of a previous total metric for the previous hypothesized state and a respective branch metric for the respective possible current state.

6. A method according to claim 5 wherein combining the total metric for the previous hypothesized state, the common portion of the branch metrics, and each of the difference variables comprises:

combining the total metric for the previous hypothesized state with the common portion of the branch metrics to provide an intermediate variable; and combining the intermediate variable with the difference variables to provide the total metric for each of the possible current states.

7. A receiver that receives communications over a communications channel, the receiver comprising:

an analog-to-digital converter that generates a sampled baseband signal corresponding to a stream of transmitted symbols; and a DFSE equalizer coupled to the analog-to-digital converter to generate an estimate of the stream of transmitted symbols using a DFSE trellis including a trellis stage for each transmitted symbol, wherein the DFSE equalizer calculates metrics associated with each branch from a previous hypothesized state to each respective possible current state, wherein the DFSE equalizer calculates a common portion of branch metrics that is common to each branch metric from the previous hypothesized state to each of the possible current states, wherein the DFSE equalizer calculates difference variables representing a difference between the common portion of the branch metrics and each of the branch metrics from the previous hypothesized state to each of the possible current states, and wherein the DFSE equalizer combines the common portion of the branch metrics and each of the difference variables to provide a respective metric for each of the possible current states.

8. A receiver according to claim 7 wherein the DFSE equalizer is in a system providing 8-PSK modulation so that there are 8 possible current states fanning out from the previous hypothesized state and wherein the DFSE equalizer provides eight respective metrics each of which is associated with a respective one of the eight possible current states fanning out from the previous hypothesized state.

9. A receiver according to claim 8 wherein the DFSE equalizer calculates four difference variables, and wherein the DFSE equalizer adds each of the four difference variables to the common portion of the branch metrics to provide four of the metrics, and subtracts each of the four difference variables from the common portion of the branch metrics to provide another four of the metrics.

10. A receiver according to claim 9 wherein the DFSE equalizer calculates a first intermediate variable as twice a product of a conjugate of a primary channel tap and a difference between a sampled signal and a summation of non-primary channel taps and hypothesized symbols corresponding to the non-primary channel taps, wherein the DFSE equalizer calculates a second intermediate variable as a product of the first intermediate variable and $e^{-j\pi/4}$, wherein the DFSE equalizer calculates a first one of the difference variables as a real portion of the first intermediate variable, wherein the DFSE equalizer calculates a second one of the difference variables as an imaginary portion of the first intermediate variable, wherein the DFSE equalizer calculates a third one of the difference variables as a real portion of the second intermediate variable, and wherein the DFSE equalizer calculates a fourth one of the difference variables as an imaginary portion of the second intermediate variable.

11. A receiver according to claim 7 wherein the DFSE equalizer provides a total metric for the previous hypothesized state wherein the total metric for the previous hypothesized state represents an error associated with a hypothesized sequence of symbols hypothesized for the previous hypothesized state and hypothesized states preceding the previous hypothesized state, wherein the DFSE equalizer combines the total metric for the previous hypothesized state with the common portion of the branch metrics and the difference variables to provide a total metric for each of the possible current states wherein each total metric is a sum of the total metric for the previous hypothesized state and a respective branch metric for the respective possible current state.

12. A receiver according to claim 11 wherein the DFSE equalizer combines the total metric for the previous hypothesized state with the common portion of the branch metrics to provide an intermediate variable, and wherein the DFSE equalizer combines the intermediate variable with the difference variables to provide the respective total metric for each of the possible current states.

13. A DFSE equalizer that calculates metrics associated with each branch from a previous hypothesized state to each respective possible current state, the DFSE equalizer comprising:

means for calculating a common portion of branch metrics that is common to each branch from the previous hypothesized state to each of the possible current states;

means for calculating difference variables representing a difference between the common portion of the branch metrics and each of the branch metrics from the previous hypothesized state to each of the possible current states; and means for combining the common portion of the branch metrics and each of the difference variables to provide a respective metric for each of the possible current states.

14. A DFSE equalizer according to claim 13 wherein the DFSE equalizer is in a system providing 8-PSK modulation so that there are 8 possible current states fanning out from the previous hypothesized state wherein the means for combining the common portion of the branch metric and each of the difference variables to provide a respective metric for each of the possible current states comprises means for providing eight respective metrics each of which is associated with a respective one of the eight possible current states fanning out from the previous hypothesized state.

15. A DFSE equalizer according to claim 14:

wherein the means for calculating the difference variables representing a difference between the common portion of the branch metrics and each of the branch metrics from the previous hypothesized state to each of the possible current states comprises means for calculating four difference variables; and wherein the means for combining the common portion of the branch metrics and each of the difference variables to provide a respective metric for each of the possible current states comprises means for adding each of the four difference variables to the common portion of the branch metrics to provide four of the metrics, and means for subtracting each of the four difference variables from the common portion of the branch metrics to provide another four of the metrics.

16. A DFSE equalizer according to claim 15 wherein the means for calculating the difference variables comprises:

means for calculating a first intermediate variable as twice a product of a conjugate of a primary channel tap and a difference between a sampled signal and a summation of non-primary channel taps and hypothesized symbols corresponding to the non-primary channel taps;

means for calculating a second intermediate variable as a product of the first intermediate variable and $e^{-j\pi/4}$;

means for calculating a first one of the difference variables as a real portion of the first intermediate variable;

means for calculating a second one of the difference variables as an imaginary portion of the first intermediate variable;

means for calculating a third one of the difference variables as a real portion of the second intermediate variable; and means for calculating a fourth one of the difference variables as an imaginary portion of the second intermediate variable.

17. A DFSE equalizer according to claim 13 further comprising:

means for providing a total metric for the previous hypothesized state wherein the total metric for the previous hypothesized state represents an error associated with a hypothesized sequence of symbols hypothesized for the previous hypothesized state and hypothesized states preceding the previous hypothesized state;

wherein the means for combining the common portion of the branch metrics and each of the difference variables comprises means for combining the total metric for the previous hypothesized state, the common portion of the branch metrics, and each of the difference variables to provide the metrics for each of the possible current states, the metric for each of the possible current states being a sum of a previous total metric for the previous hypothesized state and a respective branch metric for the respective possible current state.

18. A DFSE equalizer according to claim 17 wherein the means for combining the total metric for the previous hypothesized state, the common portion of the branch metrics, and each of the difference variables comprises:

means for combining the total metric for the previous hypothesized state with the common portion of the branch metrics to provide an intermediate variable; and means for combining the intermediate variable with the difference variables to provide the metrics for each of the possible current states.

19. A method for calculating metrics associated with branches from a previous hypothesized state to possible current states in an equalizer, the method comprising:

calculating a common portion of branch metrics from the previous hypothesized state to the possible current states;

calculating difference variables representing differences between the common portion of the branch metrics and the branch metrics from the previous hypothesized state to the possible current states; and combining the common portion of the branch metrics and the difference variables to provide the metrics for the possible current states.

20. A method according to claim 19 wherein the equalizer is in a system providing 8-PSK modulation so that there are eight possible current states branching from the previous hypothesized state:

wherein combining the common portion of the branch metrics and the difference variables to provide the metrics for the possible current states comprises providing eight metrics, each of which is associated with one of the eight possible current states branching from the previous hypothesized state.

21. A method according to claim 20 wherein calculating difference variables representing differences between the common portion of the branch metrics and the branch metrics from the previous hypothesized state to the possible current states comprises calculating four difference variables, and wherein combining the common portion of the branch metrics and the difference variables to provide the metrics for the possible current states comprises adding each of the four difference variables to the common portion of the branch metrics to provide four of the metrics, and subtracting each of the four difference variables from the common portion of the branch metrics to provide another four of the metrics.

22. A method according to claim 21 wherein calculating difference variables representing differences between the common portion of the branch metrics and the branch metrics from the previous hypothesized state to the possible current states comprises:

calculating a first intermediate variable as twice a product of a conjugate of a primary channel tap and a difference between a sampled signal and a summation of non-primary channel taps and hypothesized symbols corresponding to the non-primary channel taps;

calculating a second intermediate variable as a product of the first intermediate variable and $e^{-j\pi/4}$;

calculating a first one of the difference variables as a real portion of the first intermediate variable;

calculating a second one of the difference variables as an imaginary portion of the first intermediate variable;

calculating a third one of the difference variables as a real portion of the second intermediate variable; and calculating a fourth one of the difference variables as an imaginary portion of the second intermediate variable.

23. A method according to claim 19 further comprising:

providing a total metric for the previous hypothesized state wherein the total metric for the previous hypothesized state represents an error associated with a hypothesized sequence of symbols hypothesized for the previous hypothesized state and hypothesized states preceding the previous hypothesized state; and wherein combining the common portion of the branch metrics and the difference variables to provide the metrics for the possible current states further comprises combining the common portion of the branch metrics, the total metric for the previous hypothesized state, and the difference variables to provide the metrics for the possible current states.

24. A method according to claim 23 wherein combining the common portion of the branch metrics, the total metric for the previous hypothesized state, and the difference variables to provide the metrics for the possible current states comprises:

combining the total metric for the previous hypothesized state with the common portion of the branch metrics to provide an intermediate variable; and combining the intermediate variable with the difference variables to provide the metrics for the possible current states.

25. A method according to claim 19 wherein the equalizer comprises a DFSE equalizer.

26. A receiver that receives communications over a communications channel, the receiver comprising:

an analog-to-digital converter that generates a sampled baseband signal corresponding to a stream of transmitted symbols; and an equalizer coupled to the analog-to-digital converter to generate an estimate of the stream of transmitted symbols, wherein the equalizer calculates a common portion of branch metrics from a previous hypothesized state to possible current states, wherein the equalizer calculates difference variables representing differences between the common portion of the branch metrics and the branch metrics from the previous hypothesized state to the possible current states, and wherein the equalizer combines the common portion of the branch metrics and the difference variables to provide the metrics for the possible current states.

27. A receiver according to claim 26 wherein the receiver provides 8-PSK modulation so that there are eight possible current states branching from the previous hypothesized state and wherein the equalizer provides eight metrics, each of which is associated with one of the eight possible current states branching from the previous hypothesized state.

28. A receiver according to claim 27 wherein the equalizer calculates four difference variables, and wherein the equalizer adds each of the four difference variables to the common portion of the branch metrics to provide four of the metrics and subtracts each of the four difference variables from the common portion of the branch metrics to provide another four of the metrics.

29. A receiver according to claim 28 wherein the equalizer calculates a first intermediate variable as twice a product of a conjugate of a primary channel tap and a difference between a sampled signal and a summation of non-primary channel taps and hypothesized symbols corresponding to the non-primary channel taps, wherein the equalizer calculates a second intermediate variable as a product of the first intermediate variable and $e^{-j\pi/4}$, wherein the equalizer calculates a first one of the difference variables as a real portion of the first intermediate variable, wherein the equalizer calculates a second one of the difference variables as an imaginary portion of the first intermediate variable, wherein the equalizer calculates a third one of the difference variables as a real portion of the second intermediate variable, and wherein the equalizer calculates a fourth one of the difference variables as an imaginary portion of the second intermediate variable.

30. A receiver according to claim 26 wherein the equalizer provides a total metric for the previous hypothesized state wherein the total metric for the previous hypothesized state represents an error associated with a hypothesized sequence of symbols hypothesized for the previous hypothesized state and hypothesized states preceding the previous hypothesized state, wherein the equalizer combines the total metric for the previous hypothesized state with the common portion of the branch metrics and the difference variables.

31. A receiver according to claim 30 wherein the equalizer combines the total metric for the previous hypothesized state with the common portion of the branch metrics to provide an intermediate variable, and wherein the equalizer combines the intermediate variable with the difference variables to provide the metrics for the possible current states.

32. A receiver according to claim 26 wherein the equalizer comprises a DFSE equalizer.

* * * * *